(12) United States Patent
Lee et al.

(10) Patent No.: US 8,586,940 B2
(45) Date of Patent: Nov. 19, 2013

(54) X-RAY ACTIVE PIXEL SENSOR (APS) READOUT CIRCUIT AND READOUT METHOD

(75) Inventors: Wei-Yen Lee, Taichung (TW); Cheng-Wei Sun, Taoyuan County (TW); Yung-Hsiang Chiu, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 17 days.

(21) Appl. No.: 13/418,351

(22) Filed: Mar. 13, 2012

(65) Prior Publication Data

US 2013/0161527 A1 Jun. 27, 2013

(30) Foreign Application Priority Data

Dec. 23, 2011 (TW) .............................. 100148317 A (51) Int. Cl.
 *G01J 1/42* (2006.01)
(52) U.S. Cl.
 USPC ........................................................ 250/395
(58) Field of Classification Search
 USPC .................. 250/395, 362, 363.01–363.1, 250/370.01–370.15; 378/98.8
 See application file for complete search history.

(56) References Cited

U.S. PATENT DOCUMENTS

| | | | |
|---|---|---|---|
| 5,886,353 A * | 3/1999 | Spivey et al. | ............. 250/370.09 |
| 5,969,337 A | 10/1999 | Yiannoulos | |
| 5,982,318 A | 11/1999 | Yiannoulos | |
| 6,555,805 B2 | 4/2003 | Afghahi | |
| 6,696,687 B1 * | 2/2004 | Tomisaki et al. | ........ 250/370.09 |
| 6,801,258 B1 | 10/2004 | Pain et al. | |
| 6,950,131 B1 | 9/2005 | Kleinhans et al. | |
| 7,414,653 B2 | 8/2008 | Fowler et al. | |
| 7,791,032 B2 | 9/2010 | Karim | |
| 7,920,184 B2 | 4/2011 | Rossi | |
| 2004/0135911 A1 | 7/2004 | Nathan et al. | |
| 2007/0187609 A1 | 8/2007 | Karim | |
| 2008/0309804 A1 | 12/2008 | Huang | |
| 2010/0019127 A1 | 1/2010 | Kagawa et al. | |
| 2010/0171644 A1 | 7/2010 | Jung et al. | |
| 2011/0102645 A1 | 5/2011 | Wang | |
| 2012/0001076 A1 * | 1/2012 | Chappo et al. | ................. 250/362 |
| 2012/0217413 A1 * | 8/2012 | Kameshima et al. | ......... 250/394 |

OTHER PUBLICATIONS

Pangaud et al., "XPAD3-S: A fast hybrid pixel readout chip for X-ray synchrotron facilities", Nuclear Instruments and Methods in Physics Research A, 2008, vol. 591, p. 159-p. 162.

(Continued)

*Primary Examiner* — Kiho Kim
(74) *Attorney, Agent, or Firm* — Jianq Chyun IP Office (57) ABSTRACT

An APS readout circuit includes a pixel sensing unit, an integrating unit, and a voltage offset unit. The pixel sensing unit senses an X-ray irradiation amount to obtain a current signal in varying. The current signal is obtained by subtracting a sensing current in varying from a base current. The integrating unit is coupled with the pixel sensing unit to receive the current signal and convert the current signal into a voltage signal. The integrating unit includes a short circuit switch with a switch-on state for resetting the integrating unit and a switch-off state for directly outputting the current signal. The voltage offset unit is connected to an output terminal of the integrating unit and generates an offset voltage. In a sampling period, a base voltage of the voltage signal output from the pixel sensing unit is substantially removed by the offset voltage. An amplified sensing voltage is then obtained.

20 Claims, 9 Drawing Sheets

(56) References Cited

OTHER PUBLICATIONS

Kasap et al., "Recent advances in X-ray photoconductors for direct conversion X-ray image detectors", Current Applied Physics, 2006, vol. 6, p. 288-p. 292.

Basolo et al., "XPAD :Pixel detector for material sciences", IEEE Transactions on Nuclear Science, Oct. 2005, vol. 52, issue 5, p. 1994-p. 1998.

Barbier et al., "XA Readout Chip Characteristics and CdZnTe Spectral Measurements", IEEE Transactions on Nuclear Science, Feb. 1999, vol. 46. No. 1. p. 7-p. 18.

Lambropoulos et al., "A pixel design for X-ray imaging with CdTe sensors", Physica Status Solidi, 2008, vol. 5, No. 12, p. 3862-p. 3864.

Belev et al., "Reduction of the dark current in stabilized a-Se based X-ray detectors", Journal of Non-Crystalline Solids, 2006, vol. 352, p. 1616-p. 1620.

\* cited by examiner

X-RAY ACTIVE PIXEL SENSOR (APS) READOUT CIRCUIT AND READOUT METHOD

CROSS-REFERENCE TO RELATED APPLICATION

This application claims the priority benefit of Taiwan application serial no. 100148317, filed Dec. 23, 2011. The entirety of the above-mentioned patent application is hereby incorporated by reference herein and made a part of this specification.

TECHNICAL FIELD

The disclosure relates to an X-ray active pixel sensor (APS) readout circuit.

RELATED ART

The X-ray photography has been widely applied to biomedicine, such as, used for acquiring an image of a hard tissue in a human body, to achieve the diagnosis efficacy. In the trend of image digitalization, the Digital Radiography (DR) also tends to be developed.

The existing DR, based on the difference between X-ray sensing mechanisms, on the whole may be categorized into two main architectures: a passive pixel sensor (PPS) and an active pixel sensor (APS). The PPS architecture has such disadvantages as slow signal readout speed, excessively large noise and high required X-ray dosage. Because pixel design is complex, the APS architecture has such disadvantages as low resolution and complex driving waveform.

Taking a readout mechanism of a readout circuit of the conventional X-ray active pixel architecture sensor as an example, under the condition of maintaining low dosage of X-ray, when X-ray is irradiated to a sensor, only a tiny current is generated. This tiny current is converted into a voltage through an integrator, and the varying rate of the voltage generated by the corresponding diagnosed tissue generally is less than 20%. If this voltage is directly connected to an analog-to-digital converter (ADC), most of the digital signals formed through conversion do not change, thereby causing reduction of the actual resolution.

SUMMARY

The disclosure provides an X-ray APS readout circuit, which may effectively use the range of an ADC to improve the actual resolution.

The disclosure provides an X-ray APS readout circuit, including an X-ray active pixel sensing unit, an integrating unit, a voltage offset unit, and an ADC. An X-ray active pixel sensing unit includes a sensor. In the sampling period, an X-ray irradiation amount is sensed by the sensor to obtain a sensing voltage in varying, and a current signal for output is obtained by subtracting a sensing current from a base current. The sensing current is generated according to the sensing voltage. The integrating unit is coupled with the X-ray active pixel sensing unit, to receive the current signal and convert the current signal into a voltage signal; the integrating unit includes a short circuit switch; functions of the short circuit switch include: being used for resetting the integrating unit when being switched on in the resetting period, and directly outputting the voltage signal in the sampling period. The voltage offset unit is connected to an output terminal of the integrating unit, in which the voltage offset unit generates an offset voltage, which is used for substantially removing the base voltage of the voltage signal in the sampling period to obtain an amplified sensing voltage. The ADC converts the sensing voltage.

The disclosure provides an X-ray APS readout circuit, including an X-ray active pixel sensing unit, an integrating unit, and a voltage offset unit. The X-ray active pixel sensing unit correspondingly senses an X-ray irradiation amount to obtain a current signal in varying, in which the current signal is obtained by subtracting a sensing current in varying from a base current. The integrating unit is coupled with the X-ray active pixel sensing unit, to receive the current signal and convert the current signal into a voltage signal. The integrating unit includes a short circuit switch. Functions of the short circuit switch include: resetting the integrating unit in a switch-on state and directly outputting the current signal in a switch-off state. The voltage offset unit is connected to an output terminal of the integrating unit and generates an offset voltage. In a sampling period, a base voltage, generated by the base current, of the voltage signal output from the X-ray active pixel sensing unit is substantially removed by the offset voltage to obtain an amplified sensing voltage.

The disclosure provides an X-ray APS readout method, in which a pre-sensed direct-current bias (Vbais) is used, and this direct-current bias may be a voltage which is pre-sensed before the pixels are irradiated with X-ray; or a voltage acquired by use of a pre-established bias table. A measured voltage (Vsensing) obtained in a sampling procedure is subtracted from the pre-sensed direct-current bias (Vbais), and then the information resolution may be amplified through a back-end analog amplification circuit. The disclosure is not limited to a specific circuit combination, as long as this concept is included.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The disclosure provides a readout circuit of an X-ray active pixel architecture sensor, which may improve the grey-scale signal resolution of the X-ray sensor by offsetting a bias. The disclosure may eliminate the problem that the actual grey-scale signal resolution is insufficient due to the bias in the readout voltage, thereby increasing the resolution and reducing the irradiation amount required by X-ray.

Some embodiments are listed to illustrate the disclosure below, but the disclosure is not merely limited to the listed embodiments. Also, the listed embodiments are allowed to be properly combined, to form another embodiment.

Figure 1:
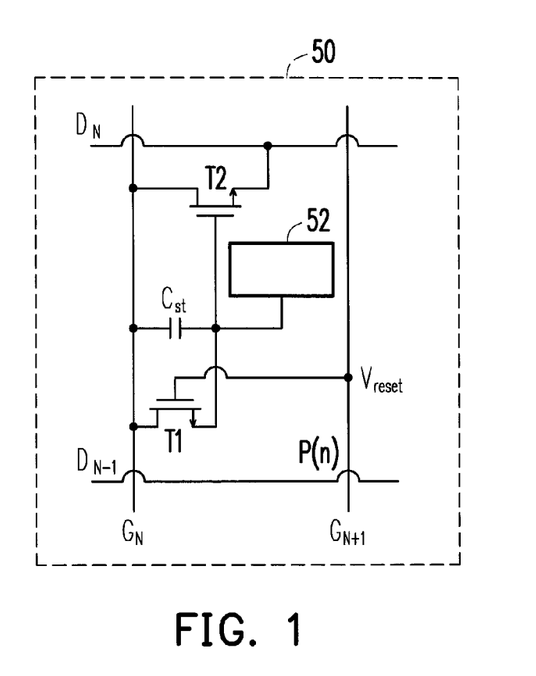
FIG. 1 and FIG. 2 are schematic diagrams of operations of an active pixel architecture sensor circuit according to an embodiment of the disclosure.
Figure 2:
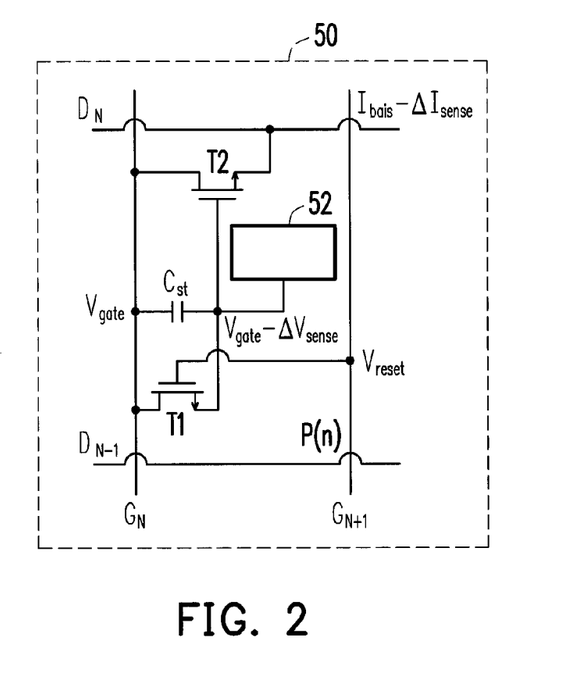

FIG. 1 and FIG. 2 are schematic diagrams of operations of an active pixel architecture sensor circuit according to an embodiment of the disclosure. Referring to FIG. 1, Dn denotes a data line, and Gn denotes a gate line. A pixel circuit for an X-ray active pixel sensing unit 50 is a circuit formed of a sensor 52, transistors T1 and T2, and a capacitor Cst. When the sensor 52 is irradiated with X-ray, a sensing voltage of $-\Delta V_{sense}$ is generated at an end of the capacitor Cst.

Referring to FIG. 2, when it is time to read out this pixel information, the corresponding gate line $G_n$ is input with a voltage of $V_{gate}$, so that a voltage signal of $V_{gate} - \Delta V_{sense}$ is sensed at an end of the capacitor Cst. This voltage influences the opened duration of the channel of the transistor T2 as a switch, thereby influencing the current $I_{bais} - \Delta I_{sense}$ generated on the data line Dn, the size of this current may reflect the amount of X-ray received by the sensor, and $\Delta I_{sense}$ is the sensing current. If the sensor 52 is not irradiated with X-ray, the sensing current $\Delta I_{sense}$ is zero, and the output current is maximum, that is, a base current $I_{bais}$. On the contrary, when the sensor 52 is irradiated with X-ray, the sensor 52 reduces the current according to the irradiation amount. Therefore, the current size may reflect the X-ray irradiation amount, and cause the grey-scale of this pixel to vary.

Figure 3:
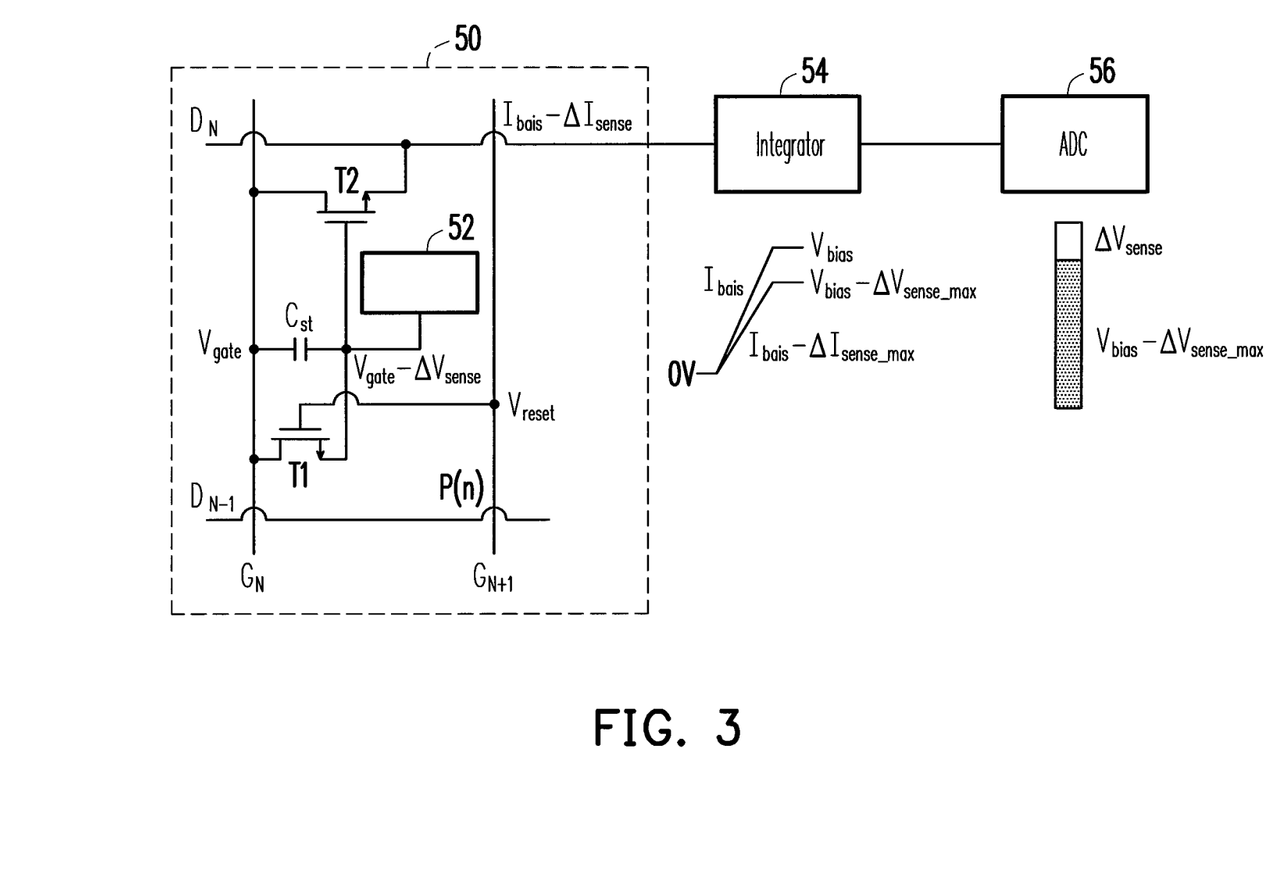
FIG. 3 shows a conventional X-ray APS readout circuit according to the sensing mechanism in FIG. 1 and FIG. 2.

FIG. 3 shows a conventional X-ray APS readout circuit according to the sensing mechanism in FIG. 1 and FIG. 2. Referring to FIG. 3, the current generated in FIG. 2 is integrated through an integrator 54 and then the integrated current is converted into a voltage signal $V_{bais} - \Delta V_{sense}$. However, the use of a conventional readout circuit causes the voltage obtained through the integrator to include a part of the base voltage $V_{bais}$. If this voltage signal including the base voltage is directly input to an ADC 56, the resolution of the digital signal formed through conversion is insufficient. This is because the ADC digitalizes the voltage signal $V_{bais} - \Delta V_{sense}$, while it is actually reflected that only the sensing voltage $-\Delta V_{sense}$ varies, and therefore, the resolution of the ADC is occupied by the base voltage $V_{bais}$.

If this conventional sensing manner maintains, in order to increase the signal resolution thereof, the resolution quality can be ensured only if an ADC with a high resolution and a strong X-ray dosage source are used, which increases the circuit cost and the risk of danger incurred by the patient due to a high irradiation dosage.

After taking the conventional sensing manner into account, the disclosure provides an X-ray APS readout circuit, which at least can improve the use efficiency of the resolution of the ADC, and fully reflect the sensing voltage $-\Delta V_{sense}$.

Figure 4:
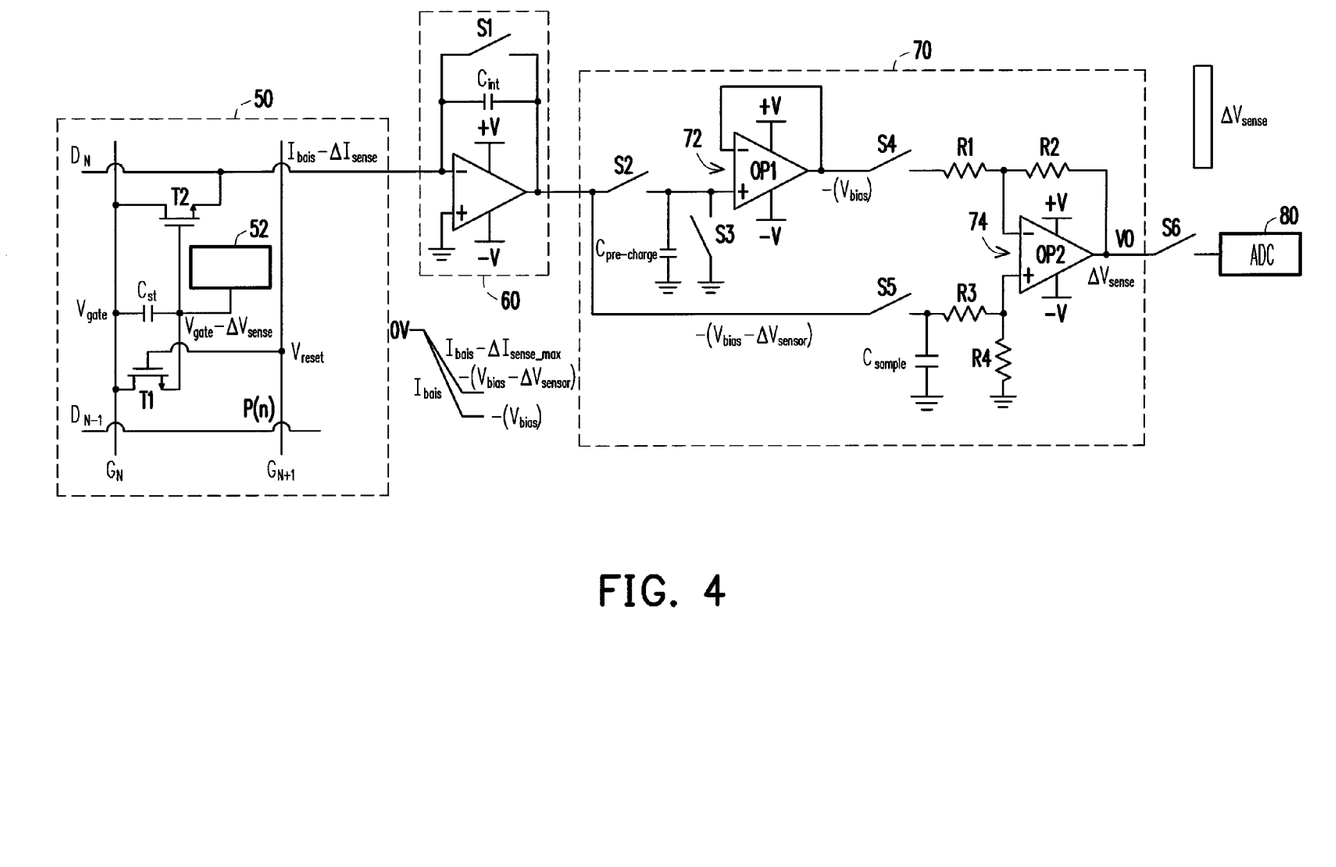
FIG. 4 is a schematic diagram of an X-ray APS readout circuit according to an embodiment of the disclosure.

FIG. 4 is a schematic diagram of an X-ray APS readout circuit according to an embodiment of the disclosure.

The X-ray APS readout circuit includes an X-ray active pixel sensing unit 50, an integrating unit 60, a voltage offset unit 70, and an ADC 80.

The X-ray active pixel sensing unit 50, as shown in FIG. 1, includes a sensor 52. As described below, the X-ray active pixel sensing unit at least may be operated in a resetting period and a sampling period. In the sampling period, an X-ray irradiation amount is sensed by the sensor 52 to obtain a sensing voltage in varying $\Delta V_{sense}$, and a current signal $I_{bais} - \Delta I_{sense}$ for output is obtained by subtracting a sensing current $\Delta I_{sense}$ from a base current $I_{bais}$; the sensing current $\Delta I_{sense}$ is generated according to the sensing voltage $\Delta V_{sense}$.

The integrating unit 60 is coupled with the X-ray active pixel sensing unit 50, to receive the current signal $I_{bais} - \Delta I_{sense}$ and convert the current signal into a voltage signal $V_{bais} - \Delta V_{sense}$. The integrating unit includes a short circuit switch S1. Functions of the short circuit switch S1 include: being used for resetting the integrating unit 60 when being switched on in the resetting period, and directly outputting the voltage signal $V_{bais} - \Delta V_{sense}$ in the sampling period. The integrating unit 60 further includes an amplifier, including a first input terminal, a second input terminal and an output terminal. The second input terminal is grounded, and the first input terminal receives the voltage signal output by the X-ray active pixel sensing unit. An integrating device Cint is connected between the first input terminal and the output terminal, to form a feedback loop. The short circuit switch S1 and the integrating device Cint are connected in parallel between the input terminal and the output terminal.

The voltage offset unit 70 is connected to an output terminal of the integrating unit 60. Functions of the voltage offset unit 70 include: generating an offset voltage, such as, a base voltage $-V_{bais}$, which is used for substantially removing the base voltage from the voltage signal output by the integrating unit 60 in the sampling period to obtain an amplified sensing voltage.

The ADC 80 uses all resolutions to convert the sensing voltage, and therefore in the case of maintaining a low X-ray dosage, a high resolution may be obtained.

The voltage offset unit 70 includes multiple switches S2-S6, a voltage generator 72, and a subtractor 74. The voltage generator 72, through control of the switches S2-S6, is used to generate the offset voltage. The voltage generator 72 in an example includes an operational amplifier OP1 and a voltage pre-charge device Cpre-charge used as a voltage buffer, which is connected to an input terminal of the operational amplifier OP1 to temporarily store the offset voltage. The switch S2 is connected to the output terminal of the integrating unit 60, and switched off in the sampling period, and the output voltage of the integrating unit 60 may be input to the subtractor 74. Additionally, the switch S2 is in a switch-on short circuit state in an initial period or resetting period, and in this way, the integrating device Cint may be reset, or the base voltage in the white picture is measured, and is temporarily stored in the voltage pre-charge device Cpre-charge of the voltage generator 72, to be connected to an input terminal of the subtractor 74. The switch S3 is used for resetting the voltage pre-charge device Cpre-charge.

The subtractor 74, through control of the switches, is used for subtracting the offset voltage from the voltage signal and substantially removing the base voltage in the sampling period to obtain an amplified sensing voltage.

Figure 8:
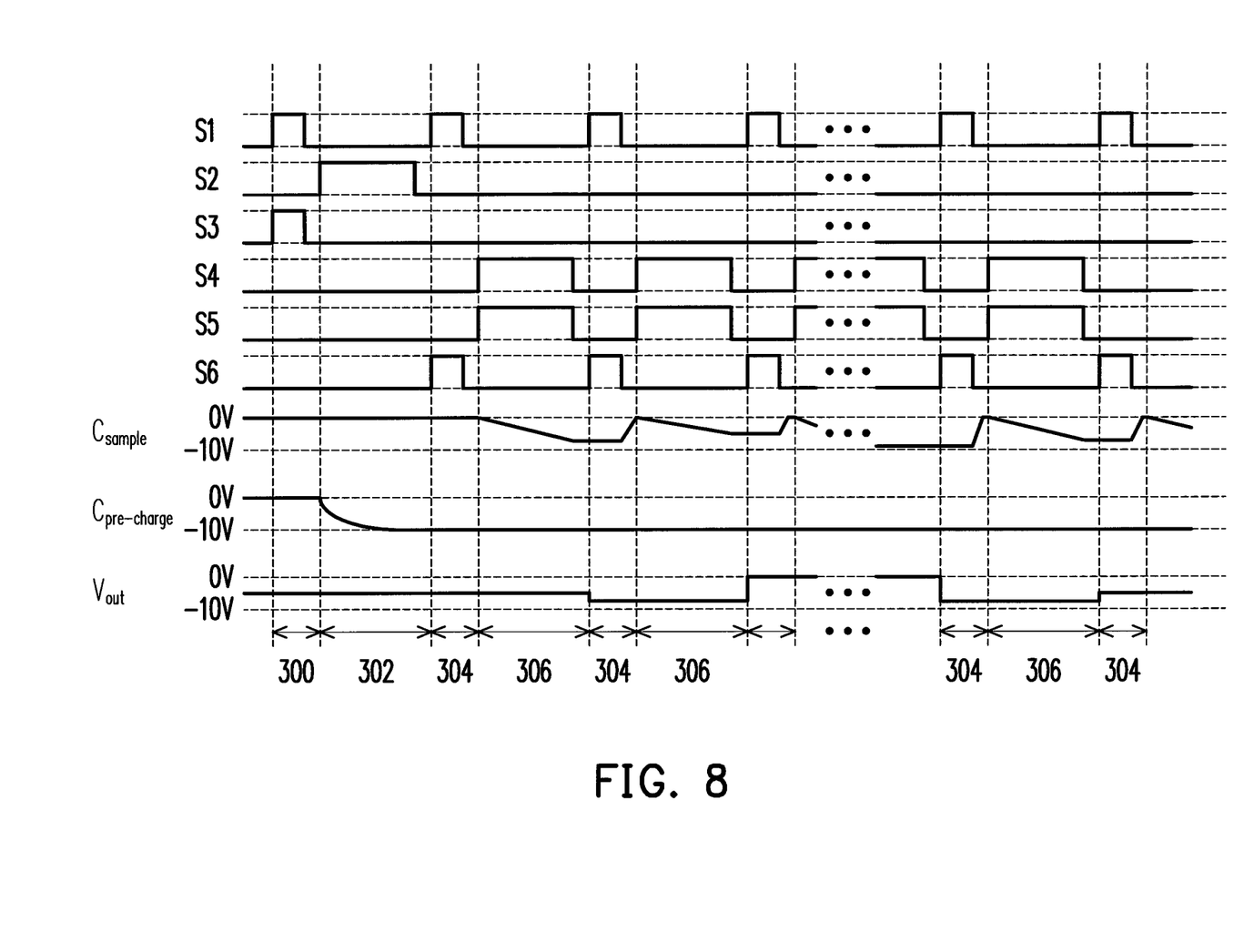
FIG. 8 is a schematic diagram showing a switch in switch-on and switch-off states in different operation periods according to the circuit in FIG. 4.

The actual operation is further illustrated in cooperation with switch states in FIG. 8. The circuit structure is first described below.

The amplifier OP1 includes a first input terminal, a second input terminal and an output terminal, in which the output terminal is fed back to the first input terminal, the second input terminal connected to an output terminal of the integrating unit 60 through the first switch, and the second switch is connected between the second input terminal and a ground. The voltage pre-charge device Cpre-charge is connected between the second input terminal of the amplifier OP1 and the ground, to store a pre-charge voltage.

The subtractor 74 includes a first input terminal, a second input terminal and an output terminal, in which the first input terminal is connected to the output terminal of the amplifier OP1 through the switch S4, and the second input terminal is connected to the output terminal of the integrating unit 60 through the switch S5. The output terminal of the subtractor 74 is connected to the ADC 80 through the switch S6. The voltage sampling device Csample, such as a capacitor, is connected between the second input terminal of the subtractor 74 and the ground.

The subtractor 74 in an example is a subtracting circuit formed of the amplifier OP2 and multiple resistor devices R1-R4, for outputting the sensing voltage.

In the previous embodiment of FIG. 4, the offset voltage is generated by actually sensing a white picture of the X-ray active pixel sensing unit 50. However, if the offset voltage required by each pixel is known in advance from outside, the offset voltage may be generated through a table look-up mechanism.

Figure 5:
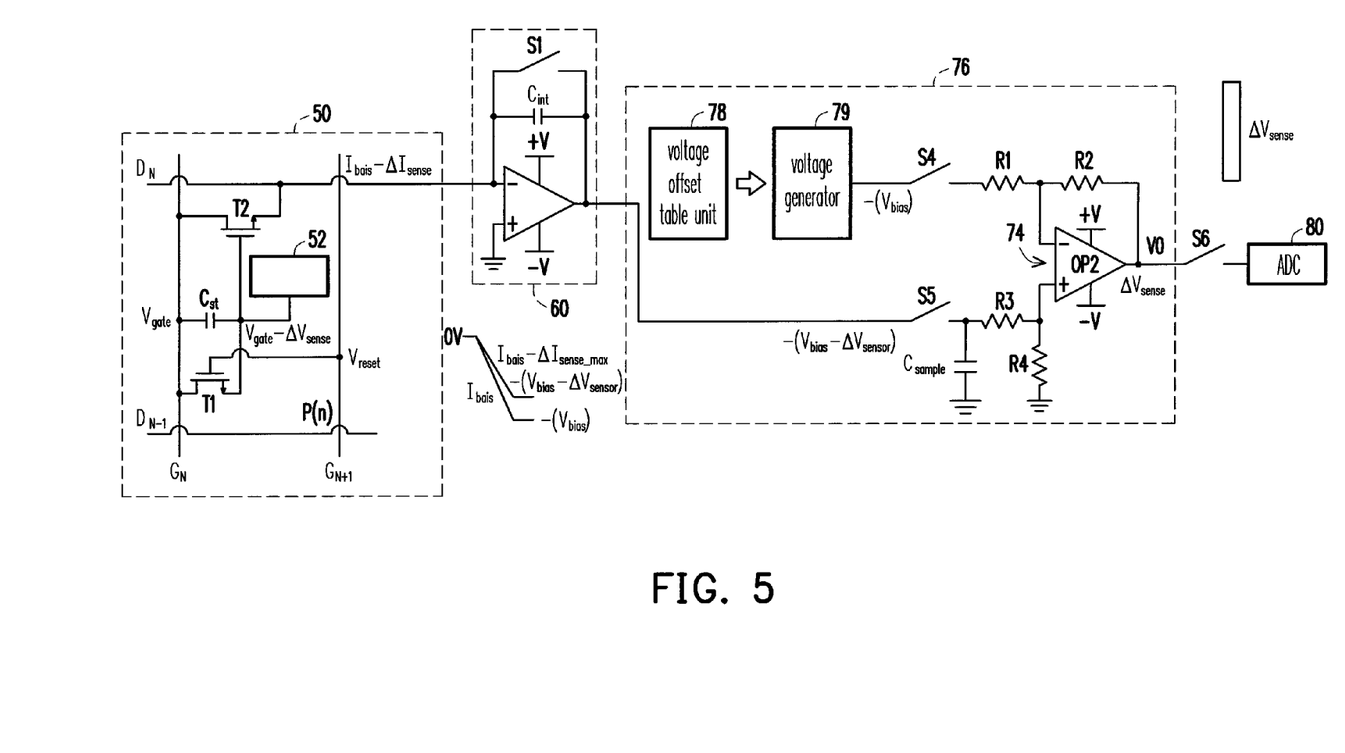
FIG. 5 is a schematic diagram of an X-ray APS readout circuit according to an embodiment of the disclosure.

An embodiment in which the offset voltage is generated through the table look-up mechanism is described below. FIG. 5 is a schematic diagram of an X-ray APS readout circuit according to an embodiment of the disclosure. In this embodiment, a voltage offset table unit 78 is adopted in a voltage offset unit 76, an offset voltage value of a corresponding pixel is provided corresponding to the read pixel, and then an actual offset voltage is generated through a voltage generator 79, such as base voltage $V_{bais}$.

Herein, it should be noted that, the offset voltage is not necessarily equal to the base voltage $V_{bais}$, and may be less than the base voltage $V_{bais}$, that is, a component of the base voltage is subtracted. In this way, the resolution of the ADC 80 is not wastefully used for the fixedly existing base voltage.

Because in the embodiment in FIG. 5, the offset voltage is generated through the table look-up mechanism, only the switches S4, S5, and S6 may be used.

Also, about positive and negative polarities of a signal, it is not unnecessarily a negative polarity operation. In other words, if the integrator 60 adopts a positive polarity signal, input terminals of amplifiers OP2 of the voltage offset unit 70 and 76 are interchanged.

Figure 6:
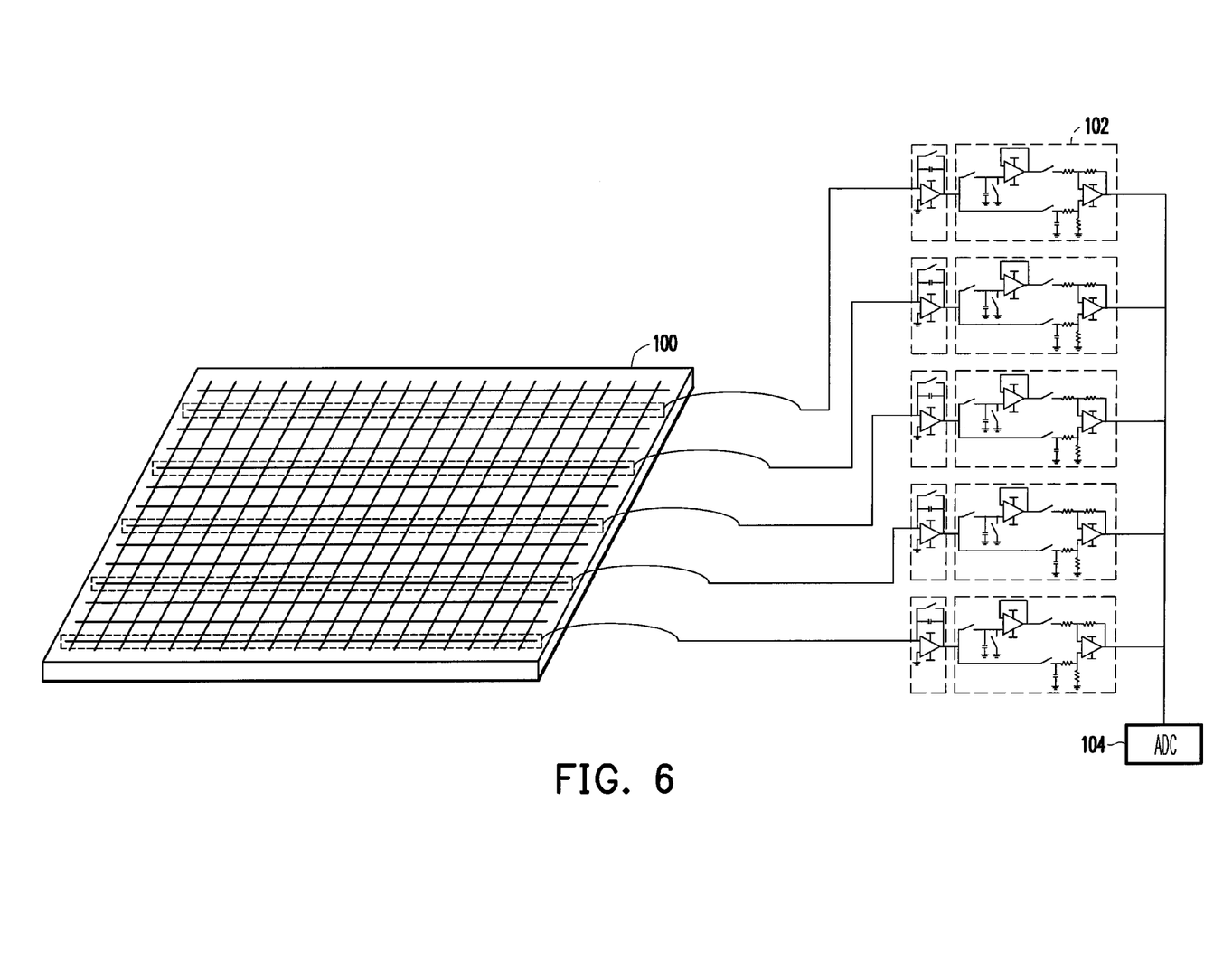
FIG. 6 is a schematic diagram of offset configuration with a row or column as the unit of an X-ray APS readout circuit according to an embodiment of the disclosure.

On the whole application, the embodiment in FIG. 4 may adopt an offset manner with a row as a unit. FIG. 6 is a schematic diagram of offset configuration with a row or column as the unit of an X-ray APS readout circuit according to an embodiment of the disclosure. Referring to FIG. 6, as far as a sensing pixel array 100 is concerned, an integrator and a voltage offset unit 102 perform the voltage offset in a manner shown by the dashed line with a row as a unit. That is to say, the base voltage of pixels in the same row used for the offset may be an averaged global value or a minimum value of all offset voltages in the row, but different rows may include different base voltages. An ADC 104 uses all resolutions to digitalize a part substantially belonging to the sensing voltage.

Figure 7:
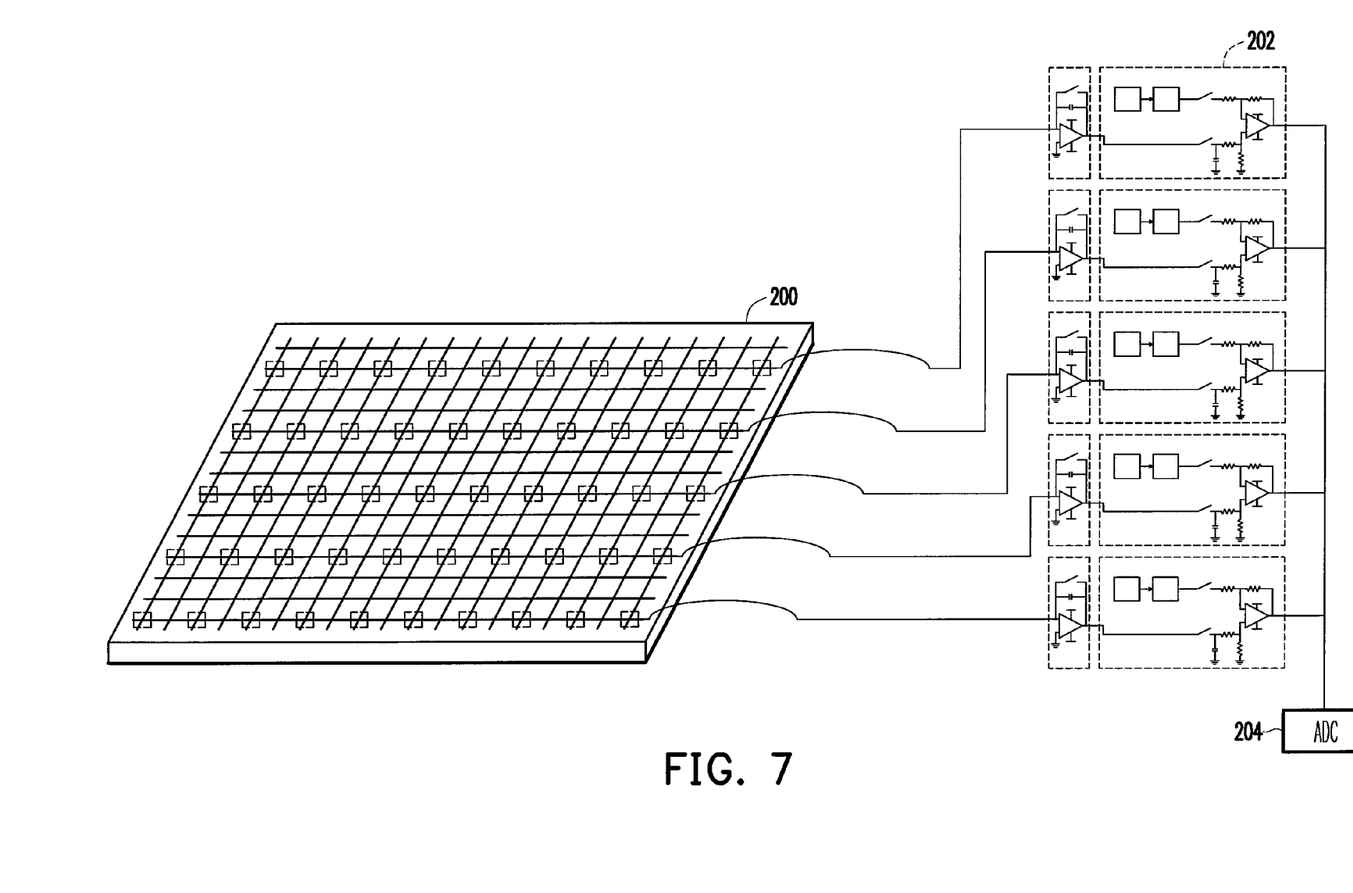
FIG. 7 is a schematic diagram of offset configuration with a pixel as the unit of an X-ray APS readout circuit according to an embodiment of the disclosure.

Also, on the whole application, the embodiment in FIG. 5 may adopt an offset manner with a pixel as a unit. FIG. 7 is a schematic diagram of offset configuration with a pixel as the unit of an X-ray APS readout circuit according to an embodiment of the disclosure. Referring to FIG. 7, as far as a sensing pixel array 200 is concerned, an integrator and a voltage offset unit 202 perform the voltage offset in a manner shown by the dashed line with a pixel as a unit. That is to say, the offset voltage required by each pixel has been acquired in advance, a corresponding offset voltage is obtained through the table look-up manner, and each pixel corresponds to an offset voltage. An ADC 204 uses all resolutions to digitalize a part substantially belonging to the sensing voltage.

As far as the operation is concerned, the embodiment in FIG. 4 is first illustrated, and it is required to first measure a base voltage or generate an offset voltage through measurement. FIG. 8 is a schematic diagram showing a switch in switch-on and switch-off states in different operation periods according to the circuit in FIG. 4. Referring to FIG. 8 together, in this embodiment, it is required to measure the base voltage $-V_{bais}$. Therefore, in an initial period 300, switches S1 and S3 are switched on, while other switches are switched off. In this way, the integrating device Cint and the voltage sampling device Csample are reset. Then, in a pre-charge period 302, only the switch S2 of the voltage offset unit 70 is switched on. The X-ray active pixel sensing unit 50 first generates a segment of white picture without X-ray, so that the amplifier is maintained at the maximum voltage $-V_{bais}$ for a period of time through the integrator 60. This voltage $-V_{bais}$ temporarily stored in the voltage pre-charge device Cpre-charge of the voltage generator 72.

Whenever X-ray is to be irradiated, switches S1 and S6 are first switched on in a resetting period 304 to reset the integrating device Cint, and meanwhile the previously sensed voltage is output to the ADC 80. In a sampling period 306, the switches S4 and S5 are switched on, and X-ray begins to be irradiated. The integrator 60 enables the voltage $-(V_{bais} - \Delta V_{sense})$ obtained after integration to flow to another end of a subtractor 74, so that voltages of two endpoints thereof are subtracted, to obtain $\Delta V_{sense}$. Next, values of resistor devices R1, R2, R3, and R4 are the range of amplifying $\Delta V_{sense}$ to conform to the input of the back-end ADC 80, and high resolution encoding may be obtained.

The integrator used by the foregoing embodiment is an inverting integrator, and a non-inverting integrator may also be used to implement a circuit, and if the non-inverting integrator is used, the same effect may be achieved only if two ends of the subtractor are reversely connect.

Figure 9:
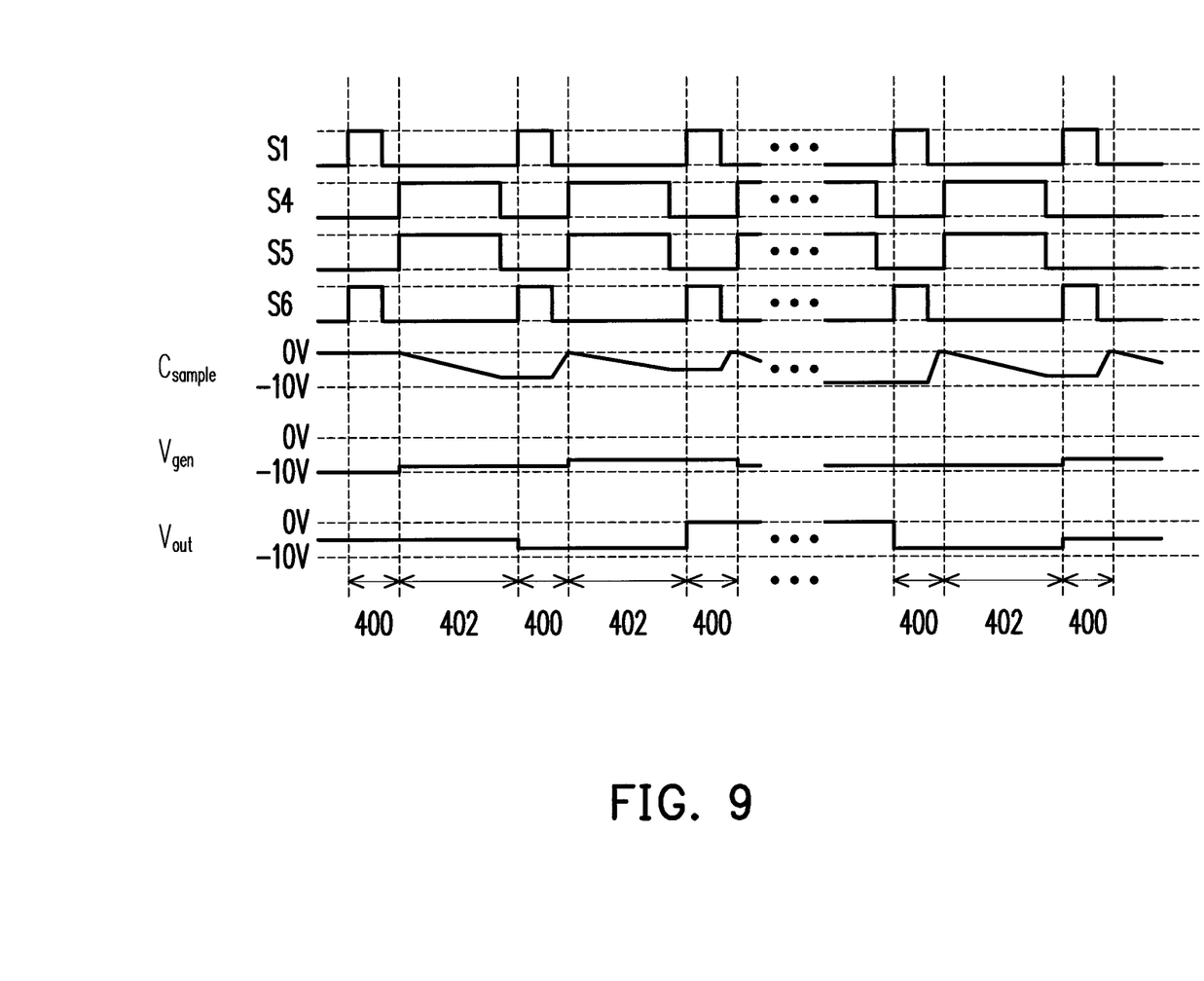
FIG. 9 is a schematic diagram showing a switch in switch-on and switch-off states in different operation periods according to the circuit in FIG. 5.

For the operation of the embodiment in FIG. 5, it is not required to first generate the white picture before X-ray irradiation. FIG. 9 is a schematic diagram showing a switch in switch-on and switch-off states in different operation periods according to the circuit in FIG. 5. Referring to FIG. 9 together, because the offset voltage is obtained through a table look-up unit, an operation may be performed only in a resetting period 400 and a sampling period 402. The switches S2 and S3 in FIG. 4 may be omitted.

In the resetting period, the switches S1 and S6 are switched on, in addition to resetting the integrating unit, the currently obtained sensing voltage is output, which is the previously sensed voltage in the sampling period. In the sampling period 402, the switches S4 and S5 are switched on. In this case, the offset voltage of the subtractor is generated through table look-up.

Figure 10:
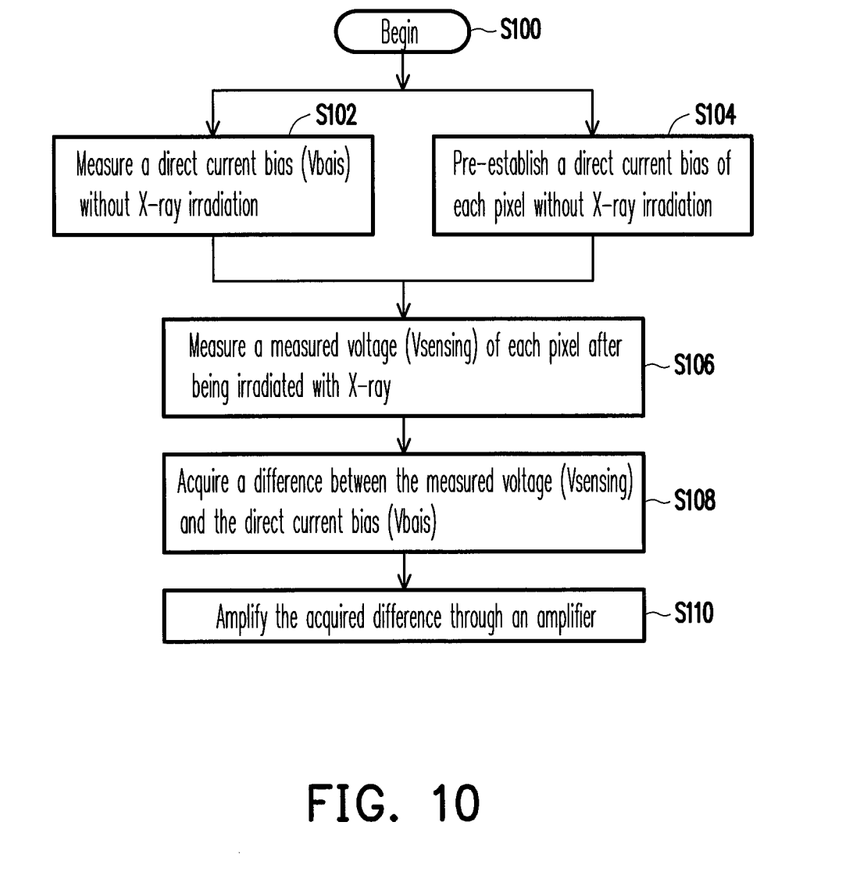
FIG. 10 is a schematic diagram of an X-ray APS readout method according to an embodiment of the disclosure.

The disclosure also provides a readout method. FIG. 10 is a schematic diagram of an X-ray APS readout method according to an embodiment of the disclosure.

Referring to FIG. 10, under unspecific circuit planning, the X-ray APS readout method includes several steps.

After a readout program begins in step S100, multiple steps are first performed. In step S102, a direct-current bias (Vbais) without X-ray irradiation may be measured. In step S104, another method for acquiring the direct-current bias is to acquire it from a value table, and the value table includes a pre-established direct-current bias of each pixel without X-ray irradiation. However, although the value table of the pre-established direct-current bias of each pixel is not required to be updated and measured each time, generally it is required to be first measured once. Therefore, step S102 and step S104 may be regarded as acquiring the value table of the direct-current bias of each pixel, their manner about how to achieve the value table may be different.

In step S106, a measured voltage (Vsensing) of each pixel after being irradiated with X-ray is measured.

In step S108, a difference between the measured voltage (Vsensing) and the direct-current bias (Vbais) is acquired, which is an absolute difference as an example. That is to say, the component of the direct-current bias is removed from the measured voltage, and only the component in varying is left.

In step S110, the acquired difference is amplified through an amplifier, and the amplified difference is used for subsequent processing.

In the disclosure, through a voltage offset unit, a part belonging to the base in a voltage signal is at least partly removed, which is all the base voltage substantially removed as an example, and the sensing voltage showing the variance of the image grey-scale may be reserved, to enable an ADC to use all effective range to perform digitalization, and improve the resolution.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An X-ray active pixel sensor (APS) readout circuit, comprising:
    an X-ray active pixel sensing unit, comprising a sensor, wherein the X-ray active pixel sensing unit at least is operated in a resetting period and a sampling period; in the sampling period, an X-ray irradiation amount is sensed by the sensor to obtain a sensing voltage in varying, and a current signal for output is obtained by subtracting a sensing current from a base current is output; and the sensing current is generated according to the sensing voltage;
    an integrating unit, coupled with the X-ray active pixel sensing unit, to receive the current signal and convert the current signal into a voltage signal, wherein the integrating unit comprises a short circuit switch; functions of the short circuit switch comprise: being used for resetting the integrating unit when being switched on in the resetting period, and directly outputting the voltage signal in the sampling period;
    a voltage offset unit, connected to an output terminal of the integrating unit, wherein the voltage offset unit generates an offset voltage, which is used for accordingly removing the base voltage of the voltage signal in the sampling period to obtain an amplified sensing voltage; and
    an analog-to-digital converter (ADC), for converting the sensing voltage.

2. The X-ray APS readout circuit according to claim 1, wherein the integrating unit further comprises:
    an amplifier, comprising a first input terminal, a second input terminal and an output terminal, wherein the second input terminal is grounded, the first input terminal receives the voltage signal output by the X-ray active pixel sensing unit; and
    an integrating device, connected between the first input terminal and the output terminal,
    wherein the short circuit switch and the integrating device are connected in parallel between the first input terminal and the output terminal.

3. The X-ray APS readout circuit according to claim 1, wherein the integrating unit further comprises:
    an integrator, comprising an input terminal and an output terminal, wherein the input terminal receives the voltage signal output by the X-ray active pixel sensing unit,
    wherein the short circuit switch and the integrating device are connected in parallel between the input terminal and the output terminal.

4. The X-ray APS readout circuit according to claim 1, wherein the voltage offset unit comprises:
    multiple switches;
    a voltage generator, through control of the switches, used to generate the offset voltage; and
    a subtractor, through control of the switches, used for subtracting the offset voltage from the voltage signal and accordingly removing the base voltage in the sampling period to obtain an amplified sensing voltage.

5. The X-ray APS readout circuit according to claim 4, wherein the voltage generator comprises an operational amplifier and a voltage buffer connected to an input terminal of the operational amplifier so as to temporarily store the offset voltage.

6. The X-ray APS readout circuit according to claim 1, wherein the voltage offset unit comprises:
    a first switch, a second switch, a third switch, a fourth switch and a fifth switch;
    a first amplifier, comprising a first input terminal, a second input terminal and an output terminal, wherein the output terminal is fed back to the first input terminal, the second input terminal connected to an output terminal of the integrating unit through the first switch, and the second switch is connected between the second input terminal and a ground;
    a voltage pre-charge device, connected between the second input terminal of the first amplifier and the ground, to store a pre-charge voltage;
    a subtractor, comprising a first input terminal, a second input terminal and an output terminal, wherein the first input terminal is connected to the output terminal of the first amplifier through the third switch, the second input terminal is connected to the output terminal of the integrating unit through the fourth switch, and the output terminal of the subtractor is connected to the ADC through the fifth switch; and
    a voltage sampling device, connected between the second input terminal of the subtractor and the ground.

7. The X-ray APS readout circuit according to claim 6, wherein the subtractor is a subtracting circuit formed of a second amplifier and multiple resistor devices, for outputting the sensing voltage.

8. The X-ray APS readout circuit according to claim 6, further comprising an initial period and a voltage pre-charge period,
    wherein in the initial period, only the short circuit switch of the integrating unit and the second switch of the voltage offset unit are switched on, to reset the integrating unit and reset the voltage pre-charge device;
    in the voltage pre-charge period, the short circuit switch of the integrating unit is switched off, the first switch of the voltage offset unit is switched on, and the second switch to the sixth switch are switched off, to store the base voltage in the voltage pre-charge device;

after the initial period and the voltage pre-charge period are completed, the resetting period and the sampling period are performed repetitively multiple times.

9. The X-ray APS readout circuit according to claim 6, wherein the integrating unit and the voltage offset unit perform the same offset and then separately perform sampling on a column of multiple sensing pixels.

10. The X-ray APS readout circuit according to claim 1, wherein the voltage offset unit comprises:

a table look-up unit, for providing offset information;

a voltage generator, for generating the offset voltage according to the offset information;

a subtractor, for subtracting the offset voltage from the voltage signal and accordingly removing the base voltage to obtain the sensing voltage; and a voltage sampling device, connected to an input terminal of the subtractor, to sample the voltage signal.

11. The X-ray APS readout circuit according to claim 10, wherein the voltage offset unit comprises:

a first switch, a second switch and a third switch, wherein the subtractor comprises a first input terminal, a second input terminal and an output terminal, the first input terminal is connected to the output terminal of the voltage generator through the first switch, the second input terminal is connected to an output terminal of the integrating unit through the second switch, and the output terminal of the subtractor is connected to the ADC through the third switch.

12. The X-ray APS readout circuit according to claim 11, wherein the subtractor is a subtracting circuit formed of an operational amplifier and multiple resistor devices, for outputting the sensing voltage.

13. The X-ray APS readout circuit according to claim 11, wherein in the resetting period, the short circuit switch of the integrating unit is switched on, the first switch and the second switch of the voltage offset unit are switched off, and the third switch is switched on to output the sensing voltage;

in the sampling period, the short circuit switch of the integrating unit is switched off, the first switch and the second switch of the voltage offset unit are switched on, and the third switch is switched off.

14. The X-ray APS readout circuit according to claim 11, wherein the integrating unit and the voltage offset unit perform offset and sampling separately on each sensing pixel of a sensing pixel array.

15. An X-ray active pixel sensor (APS) readout circuit, comprising:

an X-ray active pixel sensing unit, for correspondingly sensing an X-ray irradiation amount to obtain a current signal in varying, wherein the current signal is obtained by subtracting a sensing current in varying from a base current;

an integrating unit, coupled with the X-ray active pixel sensing unit, to receive the current signal and convert the current signal into a voltage signal, wherein the integrating unit comprises a short circuit switch, functions of the short circuit switch comprise: resetting the integrating unit in a switch-on state and directly outputting the current signal in a switch-off state; and a voltage offset unit, connected to an output terminal of the integrating unit and generating an offset voltage, wherein in a sampling period, a base voltage, generated by the base current, of the voltage signal output from the X-ray active pixel sensing unit is accordingly removed by the offset voltage to obtain an amplified sensing voltage.

16. The X-ray APS readout circuit according to claim 15, wherein the integrating unit and the voltage offset unit comprise multiple switches, and the voltage offset unit comprises a voltage generator; through control of the switches, the offset voltage corresponding to the base voltage is generated, temporarily stored in the voltage offset unit, and used to offset the received voltage signal and output the amplified sensing voltage.

17. The X-ray APS readout circuit according to claim 15, wherein the voltage offset unit comprises a table look-up unit and a voltage generator for generating the offset voltage, and the integrating unit and the voltage offset unit further comprise multiple switches; through control of the switches, the received voltage signal is offset and the amplified sensing voltage is output.

18. An X-ray active pixel sensor (APS) readout method, for reading out voltages of multiple sensing pixels of an X-ray active pixel sensing unit, comprising:

acquiring a direct-current bias value of each of the sensing pixels;

measuring a measured voltage value of each of the pixels after being irradiated with X-ray;

acquiring a difference between the measured voltage value and the direct-current bias value of each of the pixels; and amplifying the difference through an amplifier and then obtaining an amplified sensing voltage value.

19. The X-ray APS readout method according to claim 18, wherein the acquiring the direct-current bias value of each of the sensing pixels comprises: first measuring a direct-current bias value of each of the pixels without being irradiated with X-ray.

20. The X-ray APS readout method according to claim 18, wherein the acquiring the direct-current bias value each of the sensing pixels comprises: acquiring the direct-current bias value from a pre-established value table.

\* \* \* \* \*